US012292807B2

(12) United States Patent
Trivedi et al.

(10) Patent No.: US 12,292,807 B2
(45) Date of Patent: May 6, 2025

(54) METHOD AND SYSTEM FOR PERFORMING DATALOAD PROTOCOL OPERATION TESTING IN AN AVIONICS UNIT

(71) Applicant: HCL Technologies Limited, New Delhi (IN)

(72) Inventors: Jignesh Jagdishbhai Trivedi, Bengaluru (IN); Sourav Dey, Bengaluru (IN)

(73) Assignee: HCL Technologies Limited, New Delhi (IN)

( * ) Notice: Subject to any disclaimer, the term of this patent is extended or adjusted under 35 U.S.C. 154(b) by 40 days.

(21) Appl. No.: 17/901,859

(22) Filed: Sep. 2, 2022

(65) Prior Publication Data

US 2023/0176956 A1 Jun. 8, 2023

(30) Foreign Application Priority Data

Dec. 8, 2021 (IN) .............................. 202111057114

(51) Int. Cl.
*G06F 11/27* (2006.01)
*B64F 5/60* (2017.01)

(52) U.S. Cl.
CPC .............. *G06F 11/27* (2013.01); *B64F 5/60* (2017.01)

(58) Field of Classification Search
CPC .................................. G06F 11/27; B64F 5/60
See application file for complete search history.

(56) References Cited

U.S. PATENT DOCUMENTS 6,671,589 B2    12/2003  Holst et al.
7,840,770 B2    11/2010  Larson et al.
(Continued)

FOREIGN PATENT DOCUMENTS

CA    2781029 A1 *  12/2012  ................ B64F 5/40
EP    2908494 A1 *   8/2015  ................ B64F 5/40
(Continued)

OTHER PUBLICATIONS

A. Veselinović, B. M. Todorović and S. Marković, "ARINC 615A Data Loader Using Ethernet Interface for Aircrafts," 2018 26th Telecommunications Forum (TELFOR), Belgrade, Serbia, 2018, pp. 1-4 (Year: 2018).*
(Continued)

*Primary Examiner* — Matthew M Kim
*Assistant Examiner* — Indranil Chowdhury
(74) *Attorney, Agent, or Firm* — Kendal M. Sheets

(57) ABSTRACT

A method for performing dataload protocol operation testing in an avionics Line Replaceable UNIT (LRU) is disclosed. In some embodiments, the method includes sending a request to initiate transfer of a dataload sequence from an external data loader to a target hardware. The method further includes receiving an acceptance status from the target hardware to initiate transfer of the dataload sequence based on at least one of the valid or invalid dataload sequence request or response. The method further includes determining, based on the invalid dataload sequence request or response, occurrence of one or more failure scenarios associated with at least one of: the transmission of the dataload sequence; and the receiving of the acceptance status from the target hardware on different stages of dataload operation.

7 Claims, 6 Drawing Sheets

(56) References Cited

U.S. PATENT DOCUMENTS

| | | | | |
|---|---|---|---|---|
| 8,255,112 | B2* | 8/2012 | Conzachi | G07C 5/008 |
| | | | | 701/31.4 |
| 9,753,969 | B2* | 9/2017 | Ceccom | H04B 7/18506 |
| 10,353,838 | B1* | 7/2019 | Bantoft | H04L 12/4625 |
| 10,826,626 | B2* | 11/2020 | Jha | H04W 24/04 |
| 10,936,390 | B2* | 3/2021 | Balasubramanian | |
| | | | | G06F 11/0793 |
| 2005/0080920 | A1* | 4/2005 | Bender | H04L 49/90 |
| | | | | 709/236 |
| 2010/0312420 | A1* | 12/2010 | Sham | G06Q 10/00 |
| | | | | 701/3 |
| 2013/0166135 | A1* | 6/2013 | Dunsdon | G07C 5/0808 |
| | | | | 701/29.3 |
| 2015/0203216 | A1* | 7/2015 | Goldstein | B64F 5/60 |
| | | | | 701/31.4 |
| 2015/0261676 | A1* | 9/2015 | Busaba | G06F 12/0815 |
| | | | | 711/144 |
| 2016/0094683 | A1* | 3/2016 | Yun | H04L 67/01 |
| | | | | 709/203 |
| 2017/0134087 | A1* | 5/2017 | Law | H04B 7/18508 |
| 2017/0259942 | A1* | 9/2017 | Ziarno | G07C 5/085 |
| 2017/0289189 | A1* | 10/2017 | Bush | H04L 47/2441 |
| 2017/0295031 | A1* | 10/2017 | Bush | H04L 63/1433 |
| 2018/0102964 | A1* | 4/2018 | Kao | H04L 67/568 |
| 2018/0151003 | A1* | 5/2018 | Grobler | G06F 16/90335 |
| 2018/0375747 | A1* | 12/2018 | Bush | H04L 63/02 |
| 2019/0202581 | A1* | 7/2019 | Sham | G06F 11/3692 |
| 2019/0256227 | A1* | 8/2019 | Balasubramanian | |
| | | | | G06F 11/006 |
| 2020/0023992 | A1* | 1/2020 | Conaway | B64D 45/00 |
| 2020/0304217 | A1* | 9/2020 | Jha | B64F 5/60 |
| 2020/0310903 | A1* | 10/2020 | Trivedi | G01C 23/005 |
| 2021/0152237 | A1 | 5/2021 | King et al. | |
| 2023/0040617 | A1* | 2/2023 | Williams | G06F 12/0895 |
| 2023/0095120 | A1* | 3/2023 | Choi | G08G 5/0082 |
| | | | | 340/5.61 |
| 2023/0401965 | A1* | 12/2023 | Hochwarth | G08G 5/0039 |

FOREIGN PATENT DOCUMENTS

| | | | | |
|---|---|---|---|---|
| EP | 2930614 | A1 * | 10/2015 | G06F 11/1433 |
| EP | 3819801 | A1 * | 5/2021 | G06F 21/577 |
| GB | 2505204 | A | 2/2014 | |
| WO | WO-2007050164 | A1 * | 5/2007 | B64F 5/0045 |

OTHER PUBLICATIONS

Rashmi R, Srinidhi N R, Shriharsha S, Ashwani Kumar, Byra Reddy, ARINC 615A and 665-3 based Data Loader for Aircrafts, Jul. 2016 International Journal of Engineering Trends and Technology 37(5):260-264 DOI:10.14445/22315381/IJETT-V37P244, 264, Visvesvaraiah Technological University, Karnataka, India, Scientist. 'C', Avionics and Weapon systems, Aeronautical Development Agency, Karnataka, India—560 066.

Naveen Manjunath, Praveen Kumar Krishnamurthy, Client-Server based Arinc—615A Data Loading for Aircrafts, Bangalore, ISSN: 2231-5381, International Journal of Engineering Trends and Technology (IJETT)—vol. 50 No. 3 Aug. 2017, p. 187-192, Karnataka, India—560 066.

* cited by examiner

METHOD AND SYSTEM FOR PERFORMING DATALOAD PROTOCOL OPERATION TESTING IN AN AVIONICS UNIT

TECHNICAL FIELD

Generally, the invention relates to avionics unit. More specifically, the invention relates to method and system for performing dataload protocol operation testing in an avionics Line Replaceable UNIT (LRU).

BACKGROUND

Continuous advancement in fields of avionics based electronic systems leads to development of new software that needs to be frequently loaded in Line Replaceable Units (LRUs), i.e., target hardware's of the avionics based electronic systems. Moreover, in order to load new software into the target hardware's, an external data loader is used. The primary purpose of the external data loader is to upload loadable parts of the new software's to airborne computers. A secondary function of the external data loader to download data from the airborne computers. The transfer of data, i.e., the loadable parts of the new software's from the external data loader to the airborne computers is referred to as "uploading". In addition, the transfer of data from the airborne computers to the external data loader is referred to as "downloading".

Currently, many of the existing tools available are capable to transmit valid data load sequence request or response to the target hardware. However, none of the existing tools supports transmission of invalid dataload sequence request or response to the target hardware that can be used to verify many functionalities or requirements of the data load software. In other words, none of the existing tools are capable of identifying non-delivery of the dataload sequence from the external data loader to the target hardware, delay in delivery of the dataload sequence to the target hardware, and transmission of invalid protocol file to the target hardware.

Therefore, there is a need of implementing an efficient and reliable method and system for performing dataload protocol operation testing in an avionics Line Replaceable UNIT (LRU).

SUMMARY OF INVENTION

In one embodiment, a method for performing dataload protocol operation testing in an avionics Line Replaceable UNIT (LRU) is disclosed. The method may include sending a request to initiate transfer of a dataload sequence from an external data loader to a target hardware. It should be noted that, the dataload sequence corresponds to at least one of a valid or invalid dataload sequence request or response. The method may include receiving an acceptance status from the target hardware to initiate transfer of the dataload sequence based on the at least one of the valid or invalid dataload sequence request. The method may include determining based on the invalid dataload sequence request, occurrence of one or more failure scenarios associated with at least one of: the transmission of the dataload sequence and the receiving of the acceptance status from the target hardware on different stages of dataload operation.

In another embodiment, a system for performing dataload protocol operation testing in an avionics Line Replaceable UNIT (LRU) is disclosed. The system includes a processor and a memory communicatively coupled to the processor. The memory may store processor-executable instructions, which, on execution, may causes the processor to send a request to initiate transfer of a dataload sequence from an external data loader to a target hardware. It should be noted that, the dataload sequence corresponds to at least one of a valid or invalid dataload sequence request or response. The processor-executable instructions, on execution, may further cause the processor to receive an acceptance status from the target hardware to initiate transfer of the dataload sequence based on the at least one of the valid or invalid dataload sequence request. The processor-executable instructions, on execution, may further cause the processor to determine based on the invalid dataload sequence request, occurrence of one or more failure scenarios associated with at least one of: the transmission of the dataload sequence and the receiving of the acceptance status from the target hardware on different stages of dataload operation.

In yet another embodiment, a non-transitory computer-readable medium storing computer-executable instruction for performing dataload protocol operation testing in an avionics Line Replaceable UNIT (LRU) is disclosed. The stored instructions, when executed by a processor, may cause the processor to perform operations including sending a request to initiate transfer of a dataload sequence from an external data loader to a target hardware. It should be noted that, the dataload sequence may correspond to at least one of a valid or invalid dataload sequence request or response. The operations may further include receiving an acceptance status from the target hardware to initiate transfer of the dataload sequence based on the at least one of the valid or invalid dataload sequence request. The operations may further include determining based on the invalid dataload sequence request, occurrence of one or more failure scenarios associated with at least one of: the transmission of the dataload sequence and the receiving of the acceptance status from the target hardware on different stages of dataload operation.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
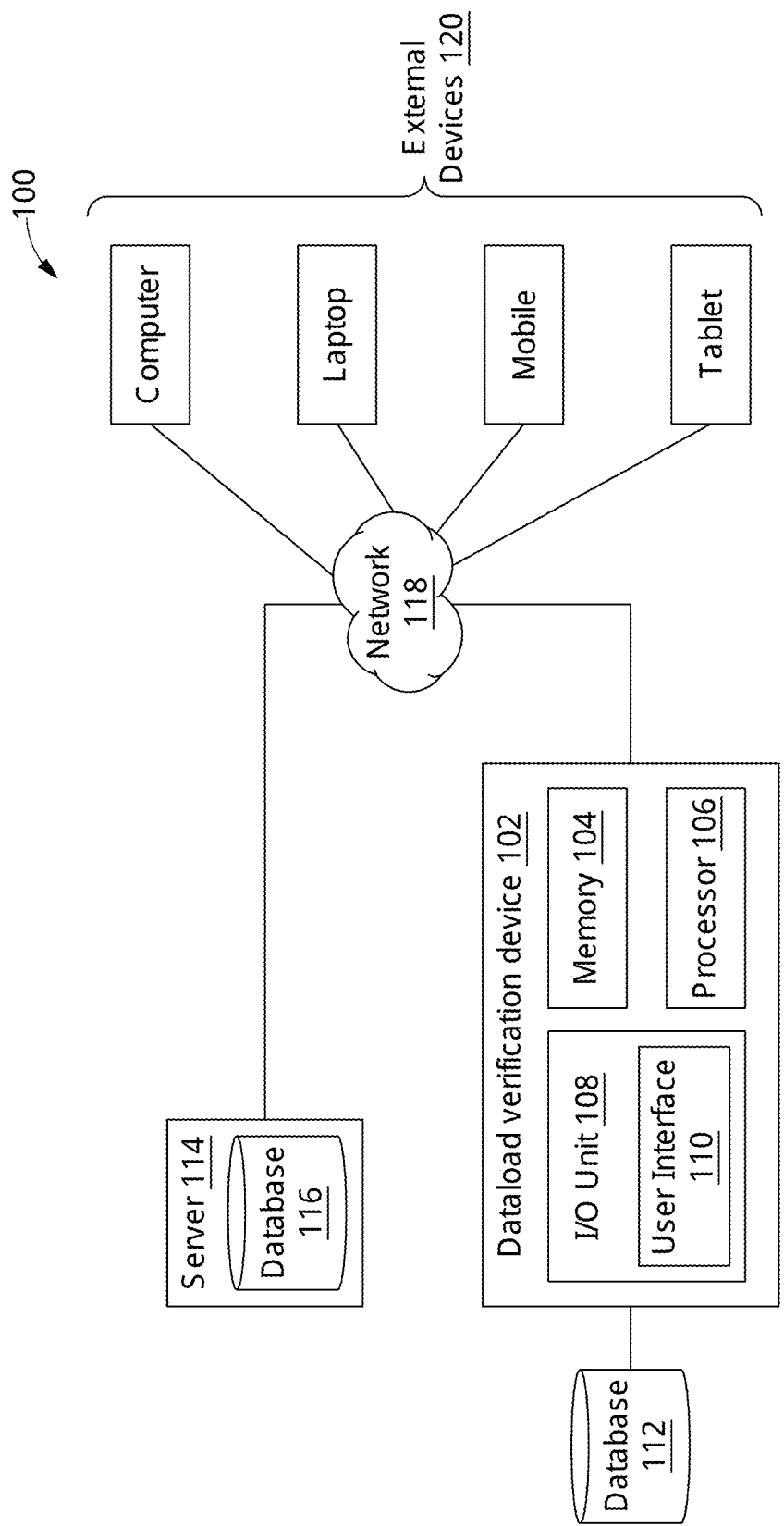
FIG. 1 illustrates a functional block diagram of a system for performing dataload protocol operation testing in an avionics Line Replaceable UNIT (LRU), in accordance with an embodiment.

A functional block diagram of a system 100 for performing dataload protocol operation testing in an avionics Line Replaceable UNIT (LRU), is illustrated in FIG. 1, in accordance with an embodiment. The system 100 may be configured to determine occurrence of one or more failure scenarios associated with at least one of a transmission of dataload sequence and a reception of the acceptance status of the transmitted dataload sequence from a target hardware. The target hardware may correspond to the LRU. In addition, the one or more failure scenarios may include at least one of a non-delivery of the dataload sequence at the target hardware, delay in transmission of the dataload sequence to the target hardware with respect to a predefined time interval, and transmission of one or more invalid protocol file to the target hardware that is distinct to the transmitted dataload sequence. In particular, in order to determine occurrence of the one or more failure scenarios, the system 100 may include a dataload verification device 102. The dataload verification device 102 may be configured to send a request to initiate transfer of the dataload sequence from an external data loader to a target hardware. In an embodiment, the dataload sequence may correspond to at least one of a valid or invalid dataload sequence request or response. Upon sending the request, the dataload verification device 102 may be configured to receive an acceptance status from the target hardware. Based on the acceptance status received, the dataload sequence may be configured to initiate the transfer of the dataload sequence. The transfer of the dataload sequence may be initiated based on the at least one of the valid and invalid dataload sequence request.

Once the acceptance status is received, the dataload verification device 102 may be configured to determine occurrence of the one or more failure scenarios associated with at least one of the transmission of dataload sequence and the reception of the acceptance status of the transmitted dataload sequence from the target hardware. In an embodiment, the dataload verification device 102 may determine occurrence of the one or more failure scenarios based on the invalid dataload sequence request. In an embodiment, the invalid dataload sequence request may include at least one of an invalid request, an invalid response, a delayed request, a delayed response, a non-delivery request, or a non-delivery response. Moreover, this complete process followed by the system 100 is further explained in detail in conjunction with FIG. 2 to FIG. 6.

Examples of the dataload verification device 102 may include, but are not limited to, a server, a desktop, a laptop, a notebook, a tablet, a smartphone, a mobile phone, an application server, or the like. The dataload verification device 102 may further include a memory 104, a processor 106, and an Input/Output (I/O) unit 108. The I/O unit 108 may further include the user interface 110. A user or an administrator (e.g., a developer or a tester) may interact with the dataload verification device 102 and vice versa through the I/O unit 108.

The I/O unit 108 may be used to display results (i.e., the acceptance status received, the one or more failure scenarios occurred, response of connection setup between the external data loader and the target hardware, etc.) based on actions performed by the dataload verification device 102, to the user. Moreover, the I/O unit 108 may be used to display the valid or invalid dataload sequence request or response.

The user interface 110 may be used by the user to provide inputs to the dataload verification device 102. Thus, for example, in some embodiment, the dataload verification device 102 may ingest an input that includes the request to initiate the transfer of the dataload sequence from the external data loader to the target hardware. Further, for example, in some embodiments, the dataload verification device 102 may render intermediate results (e.g., the acceptance status, the invalid dataload sequence request or response) or final results (e.g., the one or more failure scenarios occurred) to the user via the user interface 110.

The memory 104 may store instructions that, when executed by the processor 106, may cause the processor 106 to determine occurrence of the one or more failure scenarios. The processor 106 may perform determination of occurrence of the one or more failure scenarios based on the invalid dataload sequence request or response, in accordance with some embodiments. As will be described in greater detail in conjunction with FIG. 2 to FIG. 6, in order to perform determination of occurrence of the one or more failure scenarios, the processor 106 in conjunction with the memory 104 may perform various functions including sending of the request to initiate transfer of the dataload sequence from the external data loader to the target hardware, receiving of the acceptance status from the target hardware to initiate transfer of the dataload sequence, determining occurrence of the one or more failure scenarios, etc.

The memory 104 also store various data (e.g., the one or more failure scenarios determined, the valid dataload sequence request or response, the invalid dataload sequence request or response, the acceptance status, etc.) that may be captured, processed, and/or required by the dataload verification device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

The dataload verification device 102 may be connected to a database 112. The database 112 may be used to store information associated with the dataload sequence. In addition, the database 116 may store results generated based on the determination of occurrence of the one or more failure scenarios. Additionally, the database 112 may be periodically updated based on corrective action performed by the user in response to the determination of the occurrence of the one or more failure scenarios.

Further, the dataload verification device 102 may interact with a server 114 or external devices 120 over a network 118 for sending and receiving various data. The network 118, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In some embodiment, the dataload verification device 102 may fetch information associated with the target hardware from the server 114. In addition, the server 114 may provide information of an avionic unit of the target hardware to the user. The server 114 may further include a database 116. The database 116 may store information associated with each of the target hardware, the avionic unit of the target hardware, and an uploaded dataload sequence. By way of an example, the database 116 may store the information associated with the uploaded dataload sequence in order to distinguish a new dataload sequence that needs to be uploaded from the existing ones. The database 116 may be periodically updated based on information associated with the new dataload sequence. Alternatively, the dataload verification device 102 may receive the user input from one of the external devices 120.

Figure 2:
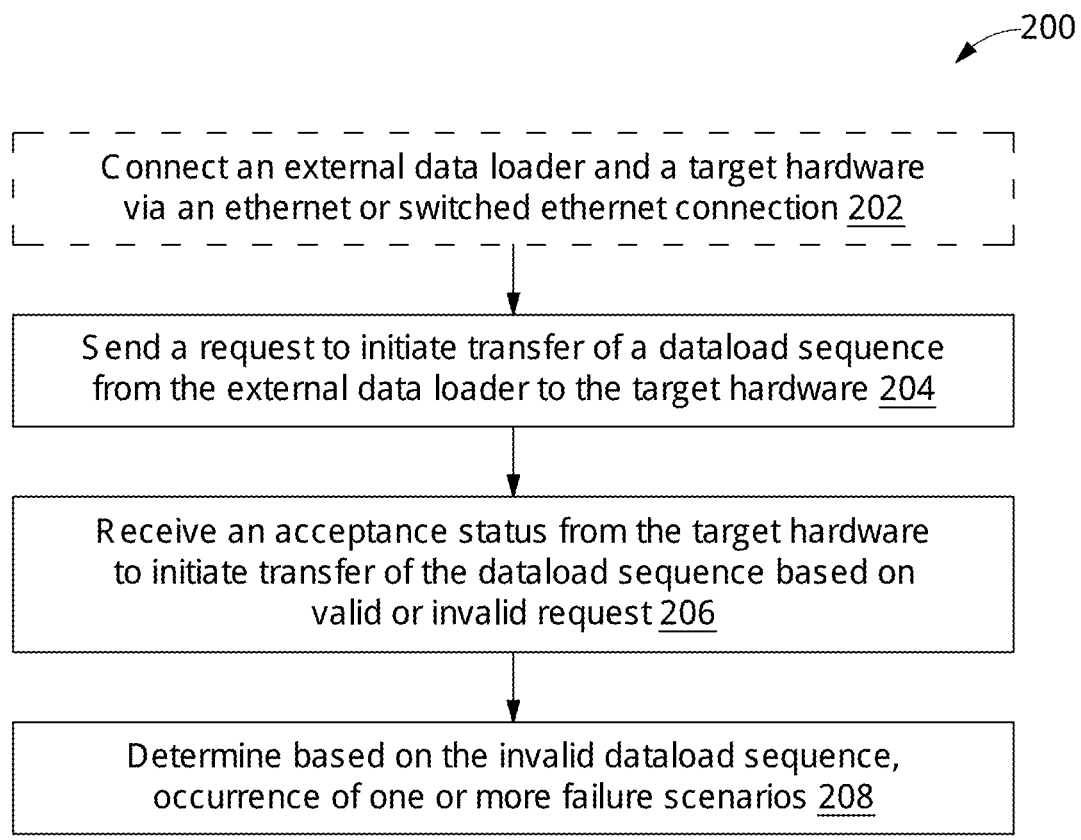
FIG. 2 illustrate a flowchart of a method for performing dataload protocol operation testing in an avionics Line Replaceable UNIT (LRU), in accordance with an embodiment.

Referring now to FIG. 2, a flowchart of a method 200 for performing dataload protocol operation testing in an avionics Line Replaceable UNIT (LRU) is illustrated, in accordance with an embodiment. At step 202, an external data loader may be connected with a target hardware via an ethernet or switched ethernet connection. Moreover, the external data loader and the target hardware may use ARINC 615A protocol for uploading and downloading performed during dataload operation. In an embodiment, the external data loader may correspond to an equipment (either hardware or software) that may be used to upload or download software. Example of the external data loader may include, but is not limited to, Maintenance Access Terminal (MAT), Portable Maintenance Access Terminal (PMAT), and Aeronautical Radio, Inc. (ARINC) 615 data loader. In addition, the target hardware may correspond to the LRU. The target hardware may be any physical component. As will be appreciated, the LRU may be a modular component of an aircraft, a ship, and a space craft that is designed to be removed and quickly replaced by line maintenance personnel (e.g., aircraft crew).

Once the connection between the external data loader and the target hardware is setup, at step 204, a request may be sent to initiate transfer of a dataload sequence from the external data loader to the target hardware. In an embodiment, the dataload sequence may also be referred as a Load Uploading Request (LUR) file. Moreover, the dataload sequence may correspond to at least one of a valid or invalid dataload sequence request or response. The valid data sequence request or response may correspond to the dataload sequence that may be true and accurate. In other words, the valid dataload sequence request may correspond at least one of a valid request, a valid response, an on-time request, an on-time response, a delivered request, and a delivered response. Moreover, the invalid dataload sequence request or response may include at least one of an invalid request, an invalid response, a delayed request, a delayed response, a non-delivery request, or a non-delivery response.

Upon sending the request, at step 206, an acceptance status may be received from the target hardware to initiate transfer of the dataload sequence. The acceptance status may be sent from the target hardware based on at least one of the valid or invalid dataload sequence request received. The acceptance status may indicate status depicting whether the request to initiate the transfer of the dataload sequence has been accepted by the target hardware or not. Once the acceptance status indicating the request to initiate the transfer has been received from the target hardware, then the external data loader may transfer the dataload sequence to the target hardware.

In one embodiment, when the dataload sequence corresponds to the valid dataload sequence request, then the dataload sequence may be successfully transferred from the external data loader and uploaded in the target hardware. In another embodiment, when the dataload sequence corresponds to the invalid dataload sequence request, then at step 208, occurrence of one or more failure scenarios may be determined based on the invalid dataload sequence request.

The one or more failure scenarios may be associated with at least one of the transmission of the dataload sequence and the reception of the acceptance status from the target hardware on different stages of dataload operation. The one or more failure scenarios may include at least one of a non-delivery of the dataload sequence at the target hardware, delay in transmission of the dataload sequence to the target hardware with respect to a predefined time interval, and transmission of one or more invalid protocol file to the target hardware that is distinct to the transmitted dataload sequence. In an embodiment, the predefined time interval may correspond to a threshold timeframe associated with receiving of the dataload sequence. A process of performing dataload protocol operation testing in the avionics LRU has been explained in greater detail in conjunction with FIG. 3-FIG. 6.

Figure 3:
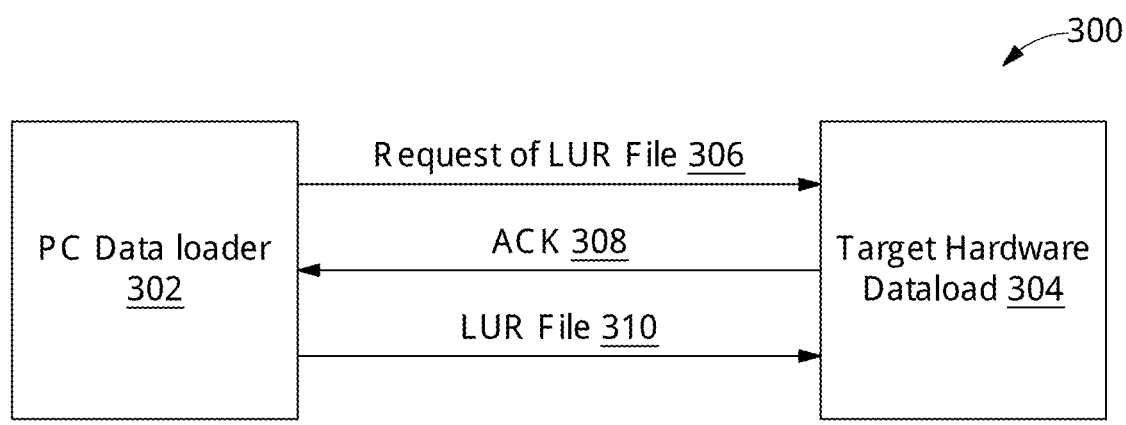
FIG. 3 illustrate a process of transmission of a dataload sequence from an external data loader to a target hardware, in accordance with an embodiment.

Referring now to FIG. 3, a process 300 of transmission of a dataload sequence from an external data loader to a target hardware is illustrated, in accordance with an embodiment. In present FIG. 3, the external data loader may correspond to a personal computer (PC) data loader 302. In addition, the target hardware (i.e., the LRU) may correspond to a target hardware dataload 304. As will be appreciated, for ease of explanation, the transmission of one dataload sequence from the PC data loader 302 has been explained with reference to one target hardware dataload 304. However, using technique disclosed in the present disclosure multiple dataload sequences may be transferred from the PC data loader 302 to any number of target hardware dataloads 304.

Initially, in order to initiated transfer of the dataload sequence from the PC data loader 302 to the target hardware dataload 304, a connection may be setup between the PC data loader 302 and the target hardware dataload 304 via the ethernet or switched ethernet connection. In an embodiment, the external data loader and target hardware uses ARINC 615A protocol for uploading and downloading of the dataload sequence performed during the dataload operation. In reference to FIG. 1, the dataload verification device 102 may install an ARINC 615A data load verification tool that is a software configured to support loading of ARINC 665 compliant software parts on the target hardware dataload 304 via the ethernet or switched ethernet connection using ARINC 615A protocol. In present embodiment, each of the ARINC 665 compliant software parts may correspond to the dataload sequence.

Moreover, the ARINC 615A data load verification tool disclosed may enable the dataload verification device 102 to perform the dataload operations such as Find Identification of Network Devices (FIND), information operation, uploading operation, and downloading operation. Moreover, the ARINC 615A data load verification tool may accept and transfer both valid and invalid media set from the PC data loader 302 to the target hardware dataload 304. In addition, the ARINC 615A data load verification tool may also support transmission of the valid and invalid dataload sequence request or response from the PC data loader 302 to the target hardware dataload 304.

Once the connection is setup, the PC data loader 302 may be configured to write and send a request to initiate transfer of a LUR file as depicted via 306. In an embodiment, the LUR file may be the dataload sequence. The dataload sequence may correspond to at least one of the valid or invalid dataload sequence request or response. Upon receiving the request from the PC data loader 302, the target hardware dataload 304 may analyze the request received. Based on analysis performed, the target hardware dataload 304 may be configured to send the acceptance status, i.e., an acknowledgement (ACK) as depicted via 304, to the PC data loader 302 based on the request received. In an embodiment, the ACK may denoted whether the request to initiate transfer of the LUR file has been accepted by the target hardware dataload 304 or not. Upon receiving the ACK, the PC data loader 302 may be configured to transfer the LUR file to the target hardware data loader 304.

In one embodiment, when the LUR file received corresponds to the valid dataload sequence request, then the dataload sequence may be successfully transferred from the PC data loader 302 and uploaded in the target hardware dataload 304. In another embodiment, when the LUR file corresponds to the invalid dataload sequence request, then the PC data loader 302 may determine reason for occurrence of the one or more failure scenarios associated with the invalid dataload sequence request. The one or more failure scenarios may be associated with at least one of the transmission of the LUR file and the receiving of the acceptance status from the target hardware dataload 304 on different stages of the dataload operation. Further, the one or more failure scenarios may include at least one of non-delivery of the dataload sequence at the target hardware dataload 304, delay in transmission of the dataload sequence (i.e., the LUR file) to the target hardware dataload 304 with respect to a predefined time interval, and transmission of one or more invalid protocol file to the target hardware dataload 304 that is distinct to the transmitted dataload sequence.

By way of an example, suppose after sending the acceptance status indicating acceptance of the LUR file (i.e., the dataload sequence), the target hardware dataload 304 may not receive the LUR file, receives the LUR file after timeout, or receives other LUR file different from the LUR file for which the request is accepted. In such scenario, the ARINC 615A data load verification tool integrated with the dataload verification device 102, may enable the dataload verification device 102 to support transmission of such LUR file that may be the invalid dataload sequence request from the PC data loader 302 to the target hardware dataload 304.

Figure 4:
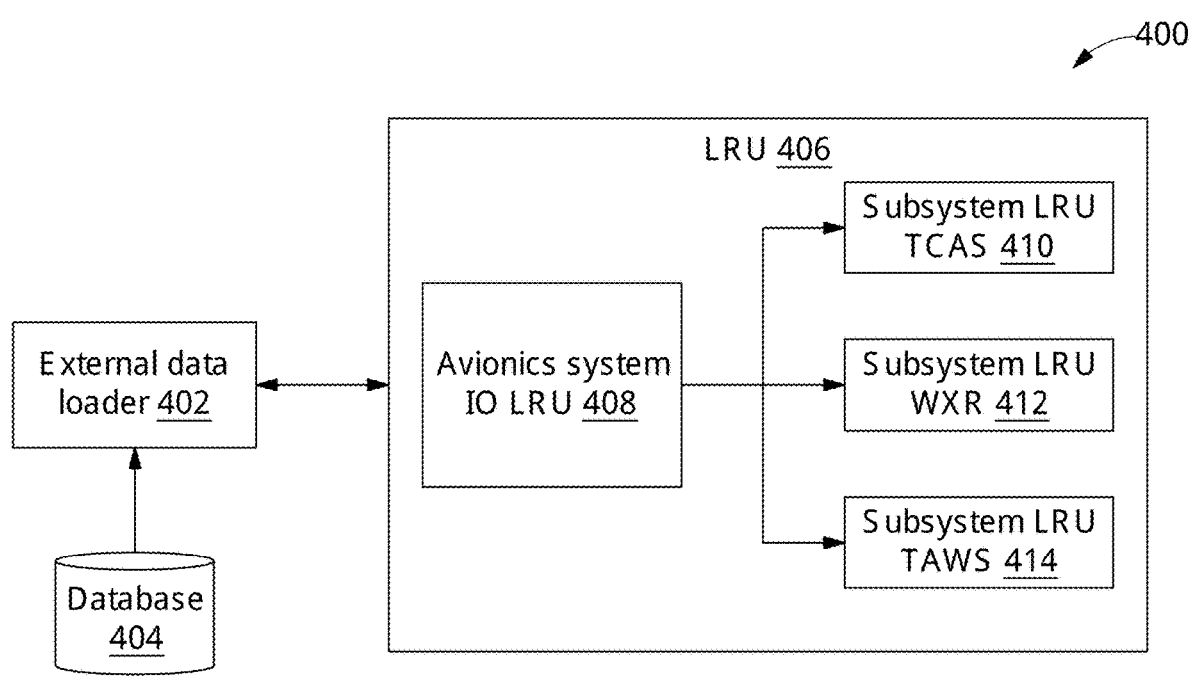
FIG. 4 illustrate a flow diagram of a process depicting transmission of a dataload sequence from an external data loader to a LRU of an avionics system, in accordance with an embodiment.

Referring now to FIG. 4, a flow diagram of a process 400 depicting transmission of a dataload sequence from an external data loader to a LRU of an avionics system is illustrated, in accordance with an embodiment. In present FIG. 4, an external data loader 402 is depicted. The external data loader 402 may be connected to a database 404. The database 404 may be configured to store media set files, load Compact Peripheral Component Interconnect (CPCI), and the dataload sequence. Further, the external data loader 402 may be connected to a LRU 406. The external data loader 402 may be connected to the LRU 406 via the ethernet or switched ethernet connection. In reference to FIG. 3, the LRU 406 may correspond to the target hardware dataload 304. Once connected, the external data loader 402 may send the request to initiate the transfer of the dataload sequence from the external data loader 402 to the LRU 406. In reference to FIG. 3, the dataload sequence may correspond to the LUR file.

Upon receiving the request, an avionics system Input/Output (I/O) LRU 408 of the LRU 406 may be configured to analyze the request received. In an embodiment, the avionics system I/O LRU 408 may correspond to an electronic device that are used on aircrafts, ships, artificial satellites, and spacecrafts. Based on analysis performed by the avionics system I/O LRU 408, the avionics system I/O LRU 408 may be configured to send the acceptance status indicating acceptance of the dataload sequence to the external data loader 402. Upon receiving the acceptance status, the external data loader 402 may transfer the dataload sequence to the avionics system I/O LRU 408. The dataload sequence may correspond to at least one of the valid or invalid data load sequence request on response. Upon receiving the dataload sequence, the avionics system I/O LRU 408 may then upload the dataload sequence received to a respective subsystem LRU, i.e., a subsystem LRU Traffic Collision Avoidance Systems (TCAS) 210, a subsystem LRU Weather Radar (WXR) 212, and a subsystem LRU Terrain Awareness Warning System (TAWS) 214.

Figure 5:
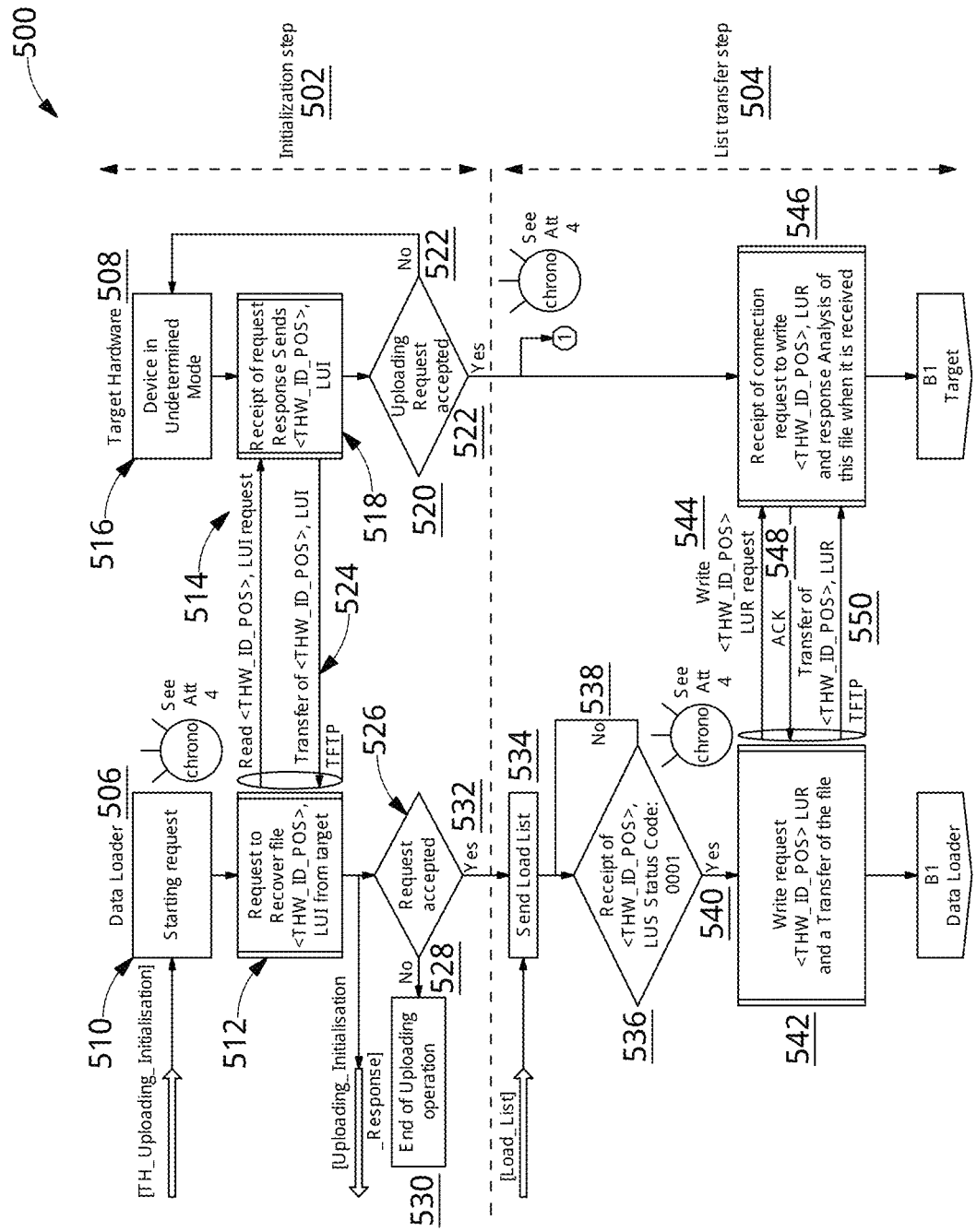
FIG. 5 represents a flow diagram of a process for connecting an external data loader to a target hardware in order to perform transmission of a dataload sequence, in accordance with an exemplary embodiment.

Referring now to FIG. 5, a flow diagram of a process 500 for connecting an external data loader to a target hardware in order to perform transmission of a dataload sequence is represented, in accordance with an exemplary embodiment. As depicted in the present FIG. 5, an initialization step 502 to initiate transfer of a dataload sequence (i.e., the LUR file) from a data loader 506 to the target dataload 508 is depicted. In addition to the initialization step 502, a list transfer step 504 for transferring of the dataload sequence from the external data loader 506 to the target dataload 508 is depicted. In reference to FIG. 3, the data loader 506 may correspond to the PC data loader 302. In addition, the target hardware 508 may correspond to the target hardware dataload 304.

Initially, the data loader 506 may start process to send a request in order to initiate transfer of the dataload sequence from the data loader 506 to the target hardware 508 as depicted via 510. In order to send the request, the data loader 506 may generate a request to establish connection between the data loader 506 and the target hardware 508 in order to send the request to transfer of the dataload sequence as depicted via 512. In an embodiment, the connection may be established via the ethernet or switched ethernet connection. The generated request, i.e., read LUI request, may be transferred to the target hardware 508 as depicted via 514. Initially, the target hardware 508 may be in undetermined mode as depicted via 516. Upon receiving the generated request, the target hardware 508 may be configured to analyze the generated request and provide a response to the data loader 506 as depicted via 518.

Further, at step 520, a check may be performed to determine whether the generated request to establish the connection has been accepted by the target hardware 508. In one embodiment, based on the check performed, when the generated request to establish the connection is not accepted by the target hardware 508, then the process 500 may move back to 516 where the target hardware 508 is in undetermined mode. In another embodiment, when the generated request to establish the connection is accepted by the target hardware 508 as depicted via 522, then the process 500 may move to 546 of the list transfer step 504. In addition, based on the check performed, the request determined to be accepted for establish the connection is send to step 1. The step 1 has been explained in detail in conjunction to FIG. 6.

Further, when the generated request to establish the connection is accepted by the target hardware 508, then the target hardware 508 may send the response to establish the connection to the data loader 506 as depicted via step 524. Upon receiving the response, the data loader 506 may perform a check to identify whether the request to establish the connection has been accepted by the target hardware 508 based on the response received as depicted via 526. In one embodiment, based on the check performed, when the request to establish the connection is identified as not accepted as depicted via 528, then the data loader 506 may end the dataload sequence uploading operation as depicted via 530.

In another embodiment, based on the check performed, when the request to establish the connection is identified as accepted as depicted via 532, then the data loader 506 may be configured to send a load list to the target hardware 508 as depicted via 534. In an embodiment, the load list may depict number of the dataload sequence that needs to be send to the target hardware 508. In order to send the load list, at 536, a check may be performed to determined LUS status code for each of the number of the dataload sequence present in the load list.

In one embodiment, based on the check performed, when the LUS status code is not determined for each of the number of the dataload sequence as depicted via 538, then the process 500 moves back to step 536. In another embodiment, based on the check performed, when the LUS status code is determined for each of the number of the dataload sequence as depicted via 540, then at 542, the data loader 506 may write a request to initiate transfer of each of the number of dataload sequence (i.e., the LUR file). The request written to initiate the transfer may be send to the target hardware 508 as depicted via 542.

Upon receiving the request, the target hardware 508 may be configured to analyze the request as depicted via 546. Based on analysis of the request, the target hardware 508 may provide the acceptance status, i.e, an acknowledge (ACL) 548 as a response to the data loader 506. Upon receiving the acceptance status, the data loader 506 may initiate transfer of each of the dataload sequence, i.e., the LUR file, as depicted via 550, and upload each of the dataload sequence on the target hardware 508.

Figure 6:
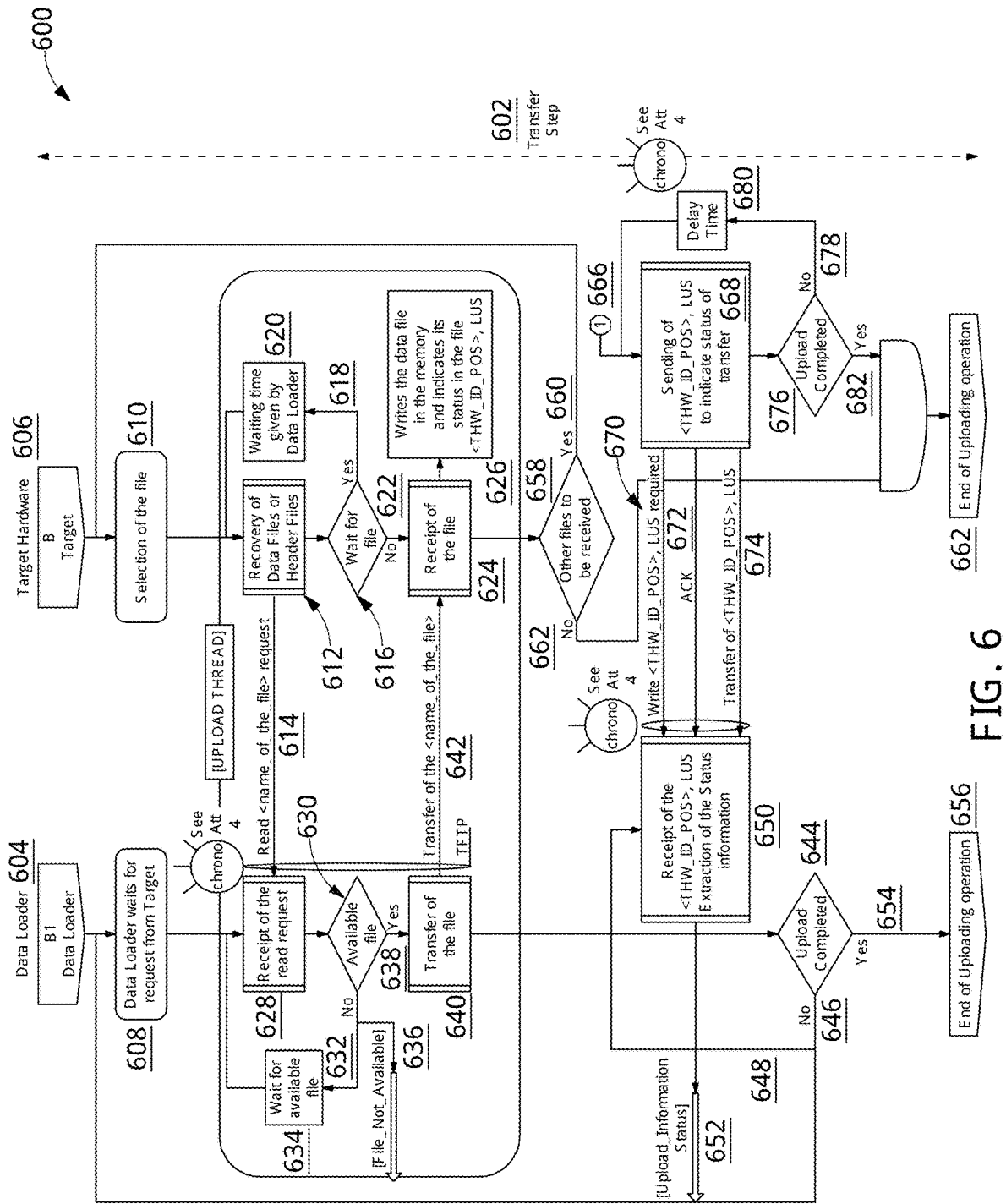
FIG. 6 represents a flow diagram of a process for initiating transfer of an invalid dataload sequence request or response from a data loader to a target hardware, in accordance with an exemplary embodiment.

Referring now to FIG. 6, a flow diagram of a process 600 for initiating transfer of an invalid dataload sequence request or response from a data loader to a target hardware is represented, in accordance with an exemplary embodiment. In process 600, a transfer step 602 to initiate transfer of the dataload sequence (i.e., the LRU) from a data loader 604 to a target hardware 606 is depicted. In reference to FIG. 3, the data loader may correspond to the PC data loader 302. In addition, the target hardware 606 may correspond to the target hardware dataload 304. Initially, the data loader 604 may wait for a request from the target hardware 606 to upload the dataload sequence as depicted via 608. Further, the target hardware 606 may perform selection of the dataload sequence (i.e., the LURf file) that needs to be uploaded as depicted via 610. Once the target hardware 606 selects the dataload sequence, the target hardware 606 may write a request to recover the dataload sequence file (e.g., a data file or a header file) as depicted via 612. In present embodiment, the dataload sequence file may correspond to the invalid dataload sequence request or response. The written request to recover the dataload sequence file is send by the target hardware 606 to the data loader 604 as depicted via 614.

Further, the target hardware 606 may perform a check to determine whether to wait for the requested dataload sequence as depicted via 616. In one embodiment, based on the check performed, on determining that the target hardware 606 needs to wait for the requested dataload sequence as depicted via 618, at 620, the target hardware 606 may wait for a waiting time period defined by the data loader 604 for the requested dataload sequence. Once the defined waiting time period is over, the target hardware 606 may re-iterate the request to the recover the dataload sequence as depicted via 612.

In another embodiment, based on the check performed, on determining that the target hardware 606 need not to wait for the requested dataload sequence as depicted via 622, at 624, the target hardware 606 may generate a receipt for the requested dataload sequence. The generated receipt may depict status of the requested dataload sequence. In addition, the generated receipt depicting the status of the requested dataload sequence may be updated in the target hardware 606 as depicted via 626.

Moreover, the request sent to recover the dataload sequence as depicted via 614 may be received by the data loader 604. Upon receiving the request, the data loader 604 may generate a receipt for the request received to recover the dataload sequence as depicted via 628. Once the receipt is generated, at step 630, a check may be performed to determine whether the requested dataload sequence is available at the data loader 606.

In one embodiment, based on the check performed, when the requested dataload sequence is determined to be not available as depicted via 632, then at 634, the data loader 604 may wait for a predefined time interval for the requested dataload sequence to be available. Once the predefined time interval is over, the data loader 604 may re-iterate process of the generation of the receipt for the request received to recover the dataload sequence as depicted via 628. Further, even after performing a set of defined re-iterations, the requested dataload sequence is determined to be not available, the requested dataload sequence may be marked as not available as depicted via 636.

In another embodiment, based on the check performed, when the requested dataload sequence is determined to be available as depicted via 638, then at 640, the data loader 604 may transfer the requested dataload sequence to the target hardware 606 as depicted via 642. The target hardware 606, upon receiving the requested dataload sequence generate the receipt for the requested dataload sequence as depicted via 204. The generated receipt may depict status of the requested dataload sequence. In addition, the generated receipt depicting the status of the requested dataload sequence may be updated in the target hardware 606 as depicted via 626.

Further, once the requested dataload sequence is transferred to the target hardware 606, at 644, the data loader 604 may perform a check to determine whether uploading of the requested dataload sequence is completed or not. In one embodiment, based on the check performed, when the uploading of the requested dataload sequence is determined as not complete, then at 646, the data loader 604 may re-iterate the process of the generation of the receipt for the request received to recover the dataload sequence depicted via 628. In addition, when the uploading of the requested dataload sequence is determined as not complete, then at 648, the data loader 604 may generate a receipt indicating status of the requested dataload sequence as depicted via 650.

Further, the generated receipt indicating the status of the requested dataload sequence may be re-iterated back to 608 as depicted via 652. The data loader 608 may then re-perform process of the generation of the receipt for the request received to recover the dataload sequence depicted via 628. In another embodiment, based on the check performed, when the uploading of the requested dataload sequence is determined to be complete as depicted via 654, then at 656, the data loader 604 may end operation of uploading the requested dataload sequence.

Moreover, once the receipt depicting status of the requested dataload sequence is generated by the target hardware 606 as depicted via 624, at 658, a check may be performed by the target hardware 606 to determine whether any other dataload sequence needs to be received. In one embodiment, based on the check performed, on determining that the other dataload sequence needs to be received as depicted via 660, then the target hardware 606 may re-iterate process of selection of the dataload sequence (i.e., the LUR file) that needs to be uploaded as depicted via 610. In another embodiment, based on the check performed, on determining that no other dataload sequence needs to be received as depicted via 662, then the target hardware 606 may end operation of uploading the requested dataload sequence as depicted via 664.

In reference to FIG. 5, the request determined to be accepted for establishing the connection received at step 1, as depicted via step 666, may be processed by the target hardware 606 in order to send LUS status code to the data loader 604 as depicted via 668. The LUS status code may indicate the status of transfer of the request dataload sequence In order to send the LUS status code, the target hardware 606 may send information associated with the requested dataload sequence to the data loader 604. The information associated with the requested dataload sequence may include a request written for a required LUS status code as depicted via 670, an acknowledgement (ACK) 672, and a transfer of the LUS status code 724. Upon receiving the information, the data loader 604 may process the received information as depicted via 650. Further, the processed information may be uploaded and re-iterated back to 608 by the data loader 604. Moreover, once the target hardware 606 sends the LUS status code indicating the transfer of the requested dataload sequence to the data loader 604 as depicted via 668, then at 676, a check may be performed to determine whether upload of the requested dataload sequence is completed or not.

In one embodiment, based on the check performed, when the upload of the requested dataload sequence is determined as not complete as depicted via 678, then at 680, a delay time may be recorded for the requested dataload sequence. Based on the recorded delay time, the target hardware 606 may re-iterate process of sending the LUS status code indicating the transfer of the requested dataload sequence to the data loader 604 depicted via 668. In another embodiment, based on the check performed, when the upload of the requested dataload sequence is determined to be complete as depicted via 682, then the target hardware 606 may end operation of uploading the requested dataload sequence as depicted via 664.

Various embodiments provide method and system for performing dataload protocol operation testing in an avionics Line Replaceable UNIT (LRU). The disclosed method and system may send a request to initiate transfer of a dataload sequence from an external data loader to a target hardware. The dataload sequence corresponds to at least one of a valid or invalid dataload sequence request or response. Moreover, the disclosed method and system may receive an acceptance status from the target hardware to initiate transfer of the dataload sequence based on at least one of the valid or invalid dataload sequence request. Further, the disclosed method and system may determine, based on the invalid dataload sequence request, occurrence of one or more failure scenarios associated with at least one of: the transmission of the dataload sequence and the receiving of the acceptance status from the target hardware on different stages of dataload operation.

The method and system for performing dataload protocol operation testing in an avionics Line Replaceable UNIT (LRU) discloses a dataload verification device that may provide some advantages like, the disclosed datalog verification device may compliant with ARINC 615A-2/3 standards for normal operation. Further, the disclosed dataload verification device may provide easy to use graphical user interface (GUI). Moreover, the disclosed dataload verification device may provide command line option for automation of test cases. Further, the disclosed dataload verification device may support for transmission of invalid dataload sequence request or response to the target hardware that will be used to verify functionalities and requirements of the external data loader.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of performing dataload protocol operation testing in an avionics Line Replaceable UNIT (LRU), the method comprising:
   sending, by a dataload verification device, a request to initiate transmission of a dataload sequence from an external data loader to a target hardware, wherein the dataload sequence corresponds to at least one of a valid or invalid dataload sequence request or response;
   receiving, by the dataload verification device, an acceptance status from the target hardware to initiate the transmission of the dataload sequence based on at least one of the valid or invalid dataload sequence request;
   scrutinizing, by the dataload verification device, accuracy of the dataload sequence;
   determining, by the dataload verification device, based on the invalid dataload sequence request, occurrence of one or more failure scenarios associated with at least one of:
      the transmission of the dataload sequence; and
      the receiving of the acceptance status from the target hardware on different stages of dataload operation;
      identifying, by the dataload verification device, a failure scenario of the one or more failure scenarios corresponding to the invalid dataload sequence request or response;
      wherein the invalid dataload sequence request or response comprises at least one of an invalid request, an invalid response, a delayed request, a delayed response, a non-delivery request, or a non-delivery response; and
   rectifying, by the dataload verification device, the failure scenario of the one or more failure scenarios corresponding to the invalid dataload sequence request or response.

2. The method as claimed in claim 1, wherein the one or more failure scenarios comprises at least one of:
   non-delivery of the dataload sequence at the target hardware;
   delay in the transmission of the dataload sequence to the target hardware with respect to a predefined time interval, wherein the predefined time interval corresponds to a threshold timeframe associated with receiving the dataload sequence; and
   transmitting one or more invalid protocol files to the target hardware that is distinct to the transmission of the dataload sequence.

3. The method as claimed in claim 1, wherein the method further comprises:
   connecting the external data loader and the target hardware via an ethernet or switched ethernet connection, and wherein the external data loader and the target hardware uses ARINC 615A protocol for uploading and downloading the dataload operation.

4. A system for performing dataload protocol operation testing in an avionics Line Replaceable UNIT (LRU), the system comprising:
   a processor; and
   a memory communicatively coupled to the processor, wherein the memory stores processor executable instructions, which, on execution, causes the processor to:
      send a request to initiate transmission of a dataload sequence from an external data loader to a target hardware, wherein the dataload sequence corresponds to at least one of a valid or invalid dataload sequence request or response;
      receive an acceptance status from the target hardware to initiate the transmission of the dataload sequence based on at least one of the valid or invalid dataload sequence request;
      scrutinize, by a dataload verification device, accuracy of the dataload sequence;
      determine, based on the invalid dataload sequence request, occurrence of one or more failure scenarios associated with at least one of:
      the transmission of the dataload sequence; and
      the receiving of the acceptance status from the target hardware on different stages of dataload operation;
      identify, by the dataload verification device, a failure scenario of the one or more failure scenarios corresponding to the invalid dataload sequence request or response;
      wherein the invalid dataload sequence request or response comprises at least one of an invalid request, an invalid response, a delayed request, a delayed response, a non-delivery request, or a non-delivery response; and
   rectify, by the dataload verification device, the failure scenario of the one or more failure scenarios corresponding to the invalid dataload sequence request or response.

5. The system of claim 4, wherein the one or more failure scenarios comprises at least one of:
   non-delivery of the dataload sequence at the target hardware;
   delay in the transmission of the dataload sequence to the target hardware with respect to a predefined time interval, wherein the predefined time interval corresponds to a threshold timeframe associated with receiving the dataload sequence; and
   transmitting one or more invalid protocol files to the target hardware that is distinct to the transmission of the dataload sequence.

6. The system of claim 4, wherein the processor executable instructions cause the processor to:
   connect the external data loader and the target hardware via an ethernet or switched ethernet connection, and wherein the external data loader and the target hardware uses ARINC 615A protocol for uploading and downloading the dataload operation.

7. A non-transitory computer-readable medium storing computer-executable instructions for performing dataload protocol operation testing in an avionics Line Replaceable UNIT (LRU), the stored instructions, when executed by a processor, cause the processor to perform operations comprises:
   sending a request to initiate transmission of a dataload sequence from an external data loader to a target hardware, wherein the dataload sequence corresponds to at least one of a valid or invalid dataload sequence request or response;

receiving an acceptance status from the target hardware to initiate the transmission of the dataload sequence based on at least one of the valid or invalid dataload sequence request;

scrutinizing, by a dataload verification device, accuracy of the dataload sequence;

determining based on the invalid dataload sequence request, occurrence of one or more failure scenarios associated with at least one of:
the transmission of the dataload sequence; and
the receiving of the acceptance status from the target hardware on different stages of dataload operation;
identifying, by the dataload verification device, a failure scenario of the one or more failure scenarios corresponding to the invalid dataload sequence request or response;
wherein the invalid dataload sequence request or response comprises at least one of an invalid request, an invalid response, a delayed request, a delayed response, a non-delivery request, or a non-delivery response; and rectifying, by the dataload verification device, the failure scenario of the one or more failure scenarios corresponding to the invalid dataload sequence request or response.

\* \* \* \* \*